Patented Nov. 6, 1945

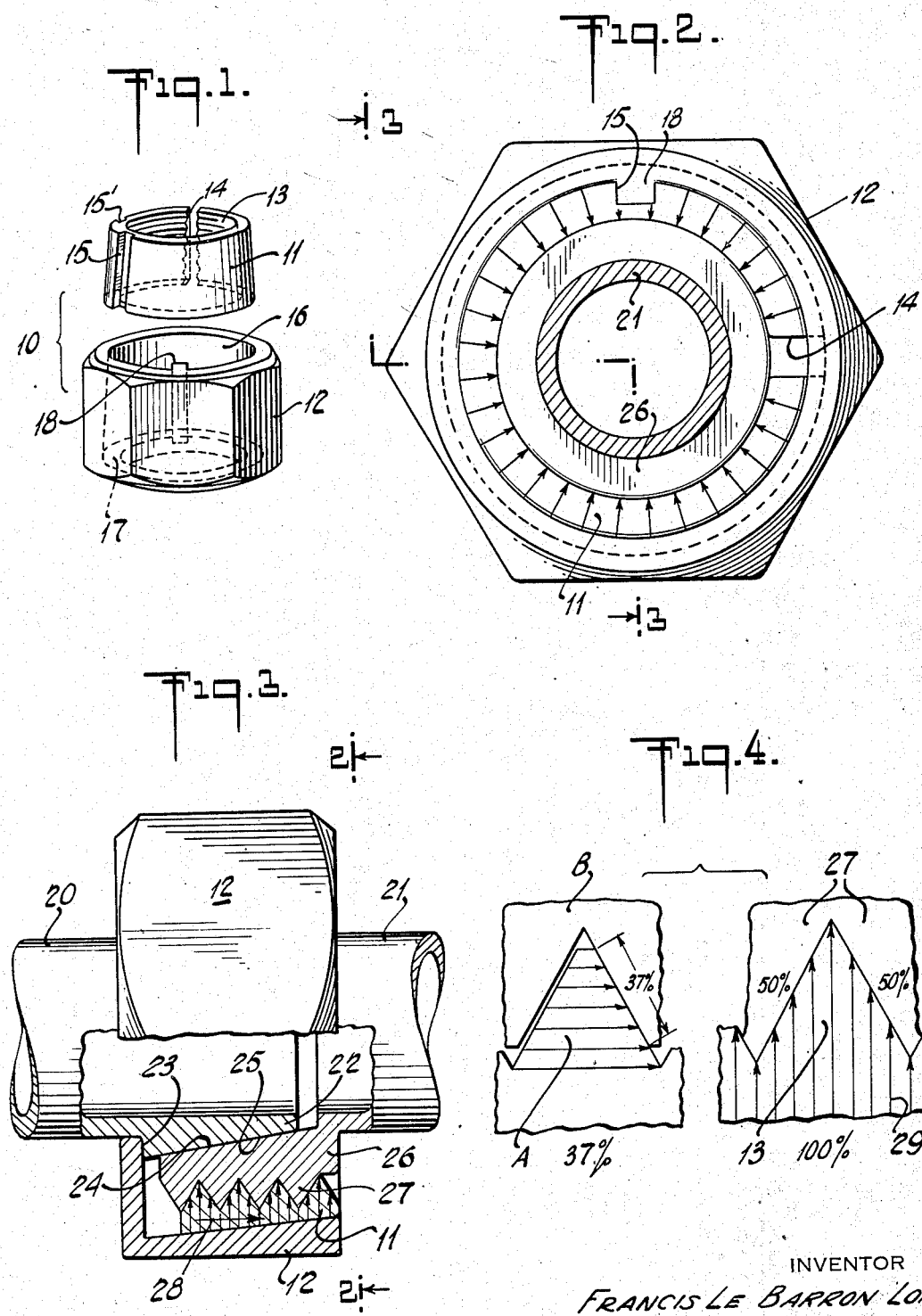

2,388,271

UNITED STATES PATENT OFFICE 2,388,271

FLANGED LOCK NUT UNIT

Francis Le Barron Lord, Bloomfield, N. J., assignor to Titelox Manufacturing Company, Montclair, N. J., a corporation of New Jersey Application October 3, 1944, Serial No. 556,981

1 Claim. (Cl. 151—19)

The device of this invention is designed primarily to serve as a connector for uniting two members, such as pipe sections, together in a positive fashion. With the device of my invention, the members to be united may be secured together in a minimum amount of time, in a manner which will form a seal at the point of connection, and at the same time permit of the ready disassembly of the parts when desired, without damage to any of the parts.

A further object of the invention is to provide a flanged lock nut unit of such structure as to enable the attainment of a predetermined wrapping effect on assembly of the parts.

An embodiment of a structure employing my invention is shown in the accompanying drawing and described in detail in the ensuing specification. This embodiment is merely by way of example and my invention is not limited thereto but includes all other forms which would come within the scope of the appended claim.

In the drawing,

Fig. 1 is a disassembled perspective view of the structure of my invention comprising an internal member and an external flanged member, Fig. 2 is a top plan view thereof taken on line 2—2 of Fig. 3, showing the unit in assembled relation, Fig. 3 is a side elevational view, partly sectional, partly fragmentary, taken on line 3—3 of Fig. 2, in the direction of the arrows, and Fig. 4 graphically illustrates the comparative effectiveness of the unit of my invention relative to standard, thread-engaging members.

In the embodiment of the invention shown in Fig. 1 of the drawing, the unit 10 comprises an internal member 11 adapted to be received within external member 12. The internal member 11 is provided with an internal threaded aperture 13 and with an axial slit 14 and an external keyway 15, and is externally tapered for a purpose presently explained. The external member 12 is provided with an internal tapered aperture 16, internal flange 17 defining the lower end thereof, and with a key 18 protruding into the aperture 16.

In operation, when it is desired to assemble the parts to hold pipe sections 20 and 21 or the like together, the internal member 11 is initially compressed to enable it to be positioned within the aperture 16 of the external member with key 18 received in the keyway 15 and the internal member resting on the flange 17. The relative dimensions of the parts are such that the internal member 11 may thereafter be advanced toward the narrow end of the aperture 16 only on the exertion of force in the threading operation described hereinafter. The external member 12, with the internal member 11 resting on the flange 17, receives the head 22 of the pipe section 20 or the like on the flange 17, said pipe 20 or the like having a shouldered portion 23 adapted to abut the flange 17. External member 12 with the internal member 11 and the head 22 of pipe section 20 positioned therein as described above, is brought into alignment with the threaded extension 26 of the pipe section 21 or the like to be secured to the pipe section 20. The head 22 of the pipe section 20 and the threaded extension 26 of the pipe section 21 are preferably provided with complementary faces 24 and 25 adapted to be effectively secured together by the structure of my invention. With the parts assembled as shown in Fig. 3 and above described, the external member 12 is rotated so that the threaded extension 26 of the pipe section 21 will be drawn inwardly into the threaded aperture 13 of the internal member 11 until the threaded extension 26 abuts the flange 17 or is otherwise precluded from further movement into the threaded aperture 13. Continued rotation of the external member 12 will cause further threading of the parts described so that the internal member 11 will then be progressively advanced toward the narrow end of the aperture 16 of the external member 12 against the resistance offered thereby. The internal member 11 thus advances in the external member 12 away from the flange 17 in the general direction indicated by the arrow 28 (Fig. 3) in the longitudinal axis of the unit 10. The internal member 11 is simultaneously moved laterally at right angles to the axis plane as indicated by the arrow 29. It is thus possible to attain a high degree of efficiency in the transmission of the energy exerted in the rotating of the member 12 to the interengaging of threads 13 and 27. This is attained by virtue of the fact that force exerted on the threaded portion 13 of the internal member 11 will be the product of the movement of member 11 on the general longitudinal axis indicated by the arrow 28 multiplied by its movement at a plane at right angles thereto generally designated by the arrows 29.

The keyway 15 is located at a predetermined circumferential point relative to the slit 14 of the internal member 11 so that one may obtain a predetermined wrapping effect to resist disengagement of the parts, generally corresponding to the effect of wrapping a loop about a rod wherein more than half of the loop is wrapped on the rod if desired. If the keyway 15 is located diametrically opposite the slit 14 (which would be at a peripheral point substantially 180° from the slit 14) then the keying of member 11 in the external member 12 would be substantially at a neutral point so that no wrapping effect would be attained. By selecting a circumferential point at which the keyway 15 is located relative to the slit 14 other than 180°, one may fix the wrapping effect to be attained, and the tendency of the parts to resist disengagement and to favor either a tightening or loosening tendency after assembly.

The slit 14 permits the internal member 11 to be tightly compressed on the threaded portion 21 of the member with which the unit 10 engages so that all surfaces of the engaging threads will be bound together and in contact. This feature is graphically illustrated in Fig. 4, indicating that both oppositely inclined planar surfaces of the threads 13 and 27 have this binding, contacting effect, resulting in a 100% pressure engagement of the threads, whereas in the engagement of the threaded member A, which may be the conventional nut, with a second threaded member B, which may be the conventional bolt, only part of one series of parallel planar surfaces of the threads engages with part of the adjacent parallel series of planar surfaces of the threads. In recognition of this fact, it has been customary to flatten the crests of the threads of members A and B as shown in Fig. 4 so that the effectively engaging surfaces of the conventional threaded bolt and nut is only 37% as against the 100% thread engagement in the use of the structure of my invention.

On assembly of the parts as shown in Fig. 3, the threads 13 and 27 will be fully engaged as described above so as to provide an effective seal and the parts will automatically tend to resist displacement due to vibration or other extraneous forces. To disengage the parts, the external member 12 is rotated in a reverse direction to that used in the assembly of the parts. After rotating the external member 12 for part of a revolution, the external member may be tapped at the outer face thereof in the general direction of the arrow 28. This action will shift the internal member in the aperture 16, breaking the taper seal so that further rotation of the external member 12 to disengage the parts may be had with comparative ease.

If desired, the internal member 11 may be provided with another keyway 15' or with a plurality of such additional keyways so that the user may select the one to receive the key 18 for the purpose above described, within the purview of this invention. Any other means for axially keying the internal member 11 in the external member 12 equivalent to the key 18 and keyway 15 would also come within the purview of this invention.

Definitions: The term "predetermined wrapping effect" as used in the specification and claims hereof shall be deemed to mean the location of the slit relative to the keying means so that on engagement or disengagement of the members a wrapping effect is attained where the slit is located other than 180° from the keying means and where the slit is located at 180° from the keying means the wrapping effect is nil—in short, the term shall be deemed to mean predetermining whether and if so the degree of the wrapping effect to be attained by the relative location of the parts referred to. The parts may be made of any desirable or suitable material and the dimensions thereof may be varied to suit the requirements of the use to which the same are to be put, the representation in the drawing being solely for the sake of illustrating one embodiment of the invention.

Having thus described my invention, what I claim as new and desire to secure by Letters Patent is:

A lock nut unit comprising an internal member provided with an axial slit, said member being externally tapered and internally threaded, and an external member provided with an internal flange and with an internally tapered portion, with the largest diameter of said internally tapered portion adjacent the flange, said internal member being provided with an external keyway, and said external member being provided with an internal key provided with positive force imparting surfaces and extending from the internally tapered portion thereof and adapted to be received in the keyway of said internal member, said keyway being so located circumferentially relative to the slit as to provide a predemined wrapping effect on assembly and use of the unit.

F. LE BARRON LORD.